US010771174B2

(12) United States Patent
Moeller

(10) Patent No.: US 10,771,174 B2
(45) Date of Patent: Sep. 8, 2020

(54) DIGITAL BROADCAST RECEIVER

(71) Applicant: NXP B.V.

(72) Inventor: Henning Moeller, Dresden (DE)

(73) Assignee: NXP B.V., Eindhoven (NL)

( * ) Notice: Subject to any disclaimer, the term of this patent is extended or adjusted under 35 U.S.C. 154(b) by 172 days.

(21) Appl. No.: 15/842,484

(22) Filed: Dec. 14, 2017

(65) Prior Publication Data

US 2018/0175489 A1 Jun. 21, 2018

(30) Foreign Application Priority Data

Dec. 21, 2016 (EP) .................................... 16205940

(51) Int. Cl.

| | |
|---|---|
| ***H04W 12/12*** | (2009.01) |
| ***H04H 20/91*** | (2008.01) |
| ***H04W 4/50*** | (2018.01) |
| ***H01Q 1/32*** | (2006.01) |
| ***G06F 21/56*** | (2013.01) |
| ***B60W 50/08*** | (2020.01) |

(52) U.S. Cl.

CPC ............ *H04H 20/91* (2013.01); *B60W 50/08* (2013.01); *G06F 21/566* (2013.01); *H01Q 1/3233* (2013.01); *H04W 4/50* (2018.02); *H04W 12/1208* (2019.01); *B60W 2556/65* (2020.02); *H04H 2201/20* (2013.01)

(58) Field of Classification Search

CPC ........ G06F 21/566; G06F 21/56; H04H 20/91

See application file for complete search history.

(56) References Cited

U.S. PATENT DOCUMENTS

| | | | | |
|---|---|---|---|---|
| 2005/0136884 | A1 | 6/2005 | Reidelsturz et al. | |
| 2012/0079261 | A1 * | 3/2012 | Leclercq | H04N 21/4181 713/2 |
| 2015/0163319 | A1 | 6/2015 | Bennett et al. | |
| 2015/0293234 | A1 * | 10/2015 | Snyder | H04K 3/65 342/357.59 |
| 2016/0007076 | A1 * | 1/2016 | Takaki | H04H 60/42 725/134 |
| 2017/0353476 | A1 * | 12/2017 | Gordon | H04L 63/1441 |

FOREIGN PATENT DOCUMENTS

| | | | |
|---|---|---|---|
| AU | 176683 | B2 | 9/2004 |
| JP | 2005-151193 | A | 6/2005 |

* cited by examiner

*Primary Examiner* — Olugbenga O Idowu
(74) *Attorney, Agent, or Firm* — Rajeev Madnawat

(57) ABSTRACT

A digital broadcast receiver and method are provided. The digital broadcast receiver comprises an input, an anti-virus unit and a host interface. The input is configured to receive a digital broadcast. The anti-virus unit is configured to carry out an anti-virus check on the at least one data channel received as part of the digital broadcast. The host interface is configured to provide the at least one decoded data channel to a host.

17 Claims, 4 Drawing Sheets

DIGITAL BROADCAST RECEIVER

CROSS-REFERENCE TO RELATED APPLICATIONS

This application claims the priority under 35 U.S.C. § 119 of European Patent application no. 16205940.6, filed on Dec. 21, 2016, the contents of which are incorporated by reference herein.

FIELD

The present application related to digital radio and in particular but not exclusively to digital broadcast receivers and their circuitry.

BACKGROUND

Digital broadcasting, for example digital audio broadcasting (DAB) supports the broadcasting of data in enhanced packet modes for example like Multimedia Object Transfer (MOT), Transport Protocol Experts Group (TPEG) and Extended Programme Associated Data (X-PAD). In a vehicle radio, a digital receiver may receive the transmitted data and carry out channel decoding processing on the data.

The channel decoded received data may be transferred to a head unit or host processor. The head unit may process the data and present it a user of a vehicle. The head unit may also process data from other systems of the vehicle, some of which are safety critical. The security of the head unit may be of interest.

SUMMARY

According to a first aspect, there is provided a digital broadcast receiver comprising: an input configured to receive a digital broadcast; an anti-virus unit configured to carry out an anti-virus check on the at least one data channel received as part of the digital broadcast; and a host interface configured to provide the at least one decoded data channel to a host.

The at least one data channel may be an encoded data channel. The at least one data channel may comprise all of the encoded data channels received as part of the digital broadcast. The digital broadcast receiver may further comprise a first processing path configured to decode a first data channel of the digital broadcast. The antivirus unit may be configured to carry out the antivirus check on the decoded first data channel. The anti-virus unit may be configured to carry out the anti-virus check on the at least one data channel when that data channel is requested by a host processor.

When malicious data is identified by the anti-virus check, the anti-virus unit may be further configured to forward an indication of the malicious data to the host processor. When malicious data is identified by the anti-virus check, the anti-virus unit may be further configured to delete the malicious data. When malicious data is identified by the anti-virus check, the anti-virus unit may be further configured to forward the malicious data to the host processor along with the indication. When malicious data is not identified by the anti-virus check, the anti-virus unit may be further configured to forward the at least one decoded data stream to the host processor. The digital broadcast receiver may be a digital audio broadcast DAB+ receiver.

According to a second aspect, there is provided a method comprising: receiving a digital broadcast comprising a plurality of data channels; carrying out an anti-virus check on the at least one of the plurality of data channels; and providing the at least one decoded data channel to a host.

The at least one data channel may be an encoded data channel. The method may further comprise carrying out the antivirus check on the plurality of data channels prior to any one of the data channels being decoded. The method may further comprise decoding a first data channel of the digital broadcast.

FIGURES

Embodiments will be described, by way of example only, with reference to the drawings, in which.

It will be appreciated that for features that span more than one drawing like reference numerals indicate the like feature.

DETAILED DESCRIPTION

Digital broadcasting systems exists in which audio data, such as radio programs, are digitized and compressed to be broadcast using a digital modulation scheme. One example of such a digital broadcasting technology is Digital Analog Broadcast (DAB). Digital Audio Broadcasting (DAB) may define both programme services, for example radio shows, as well as data services. The programme and data service may be multiplexed and broadcast together. In one example, the multiplexed data may form ensemble data, for example when operating in accordance with ETSI EN 300 401 v 1.4.1. The multiplexed data may take the form of a digital radio signal comprises one or more data channels.

Digital services include data that may be used for applications such as navigation or may provide entertainment services, for example slide shows or album covers or information. In some examples, navigation data may come in the form of TPEG (transport protocol experts group) data and the entertainment data may come in the form of multimedia object transfer (MOT) data. It will however be appreciated that this is by way of example only and the data service portion of the multiplexed data may take any suitable form.

The multiplexed data may be transmitted via a suitable medium (for example air, in the example of radio) and will be received by a digital radio receiver. The digital radio receiver may process the data, for example carry out front end processing, error checking and demultiplexing and place the data in a format suitable to be sent to a head unit for broadcast.

Figure 1:
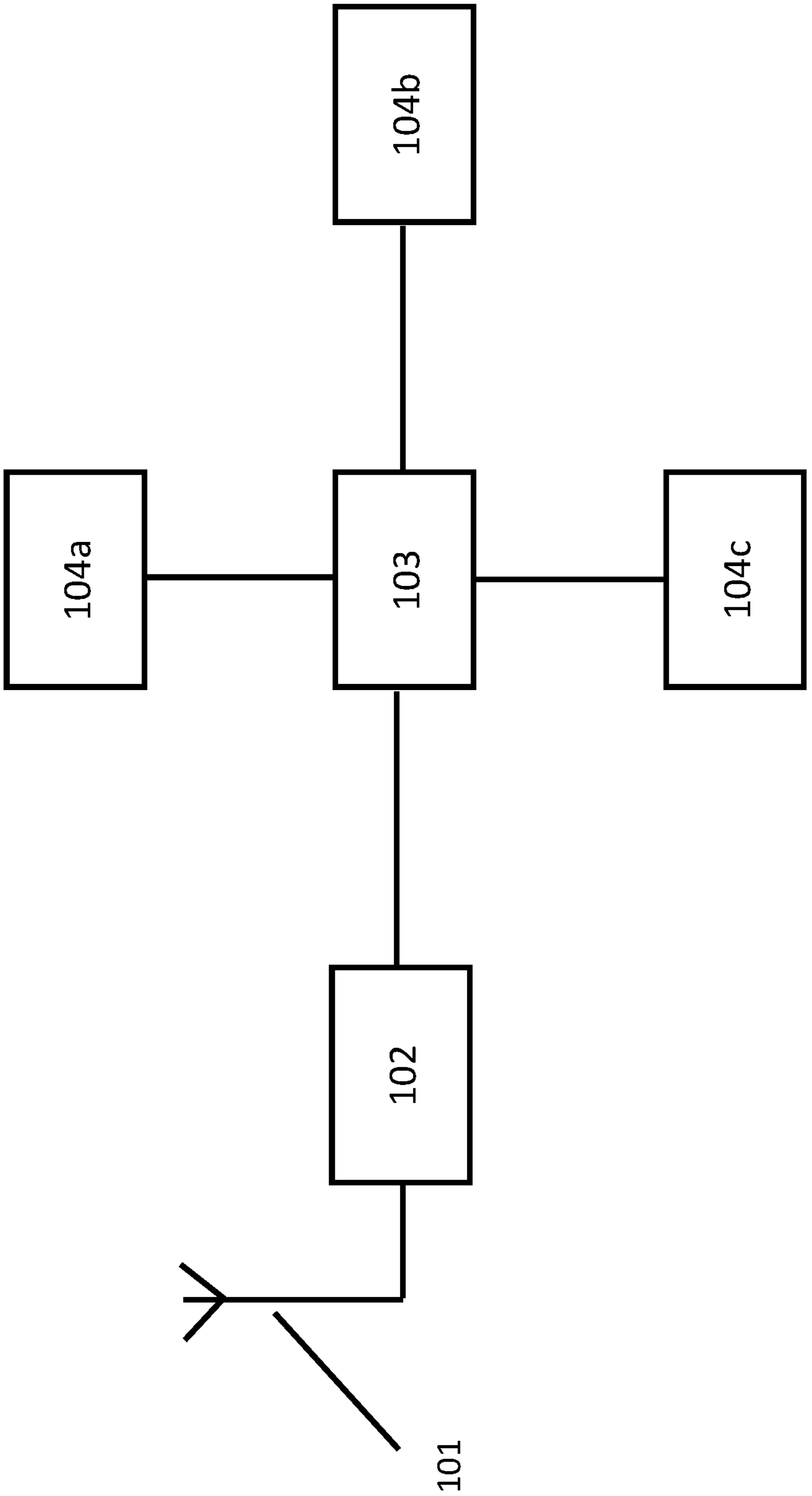
FIG. 1 is an example of a digital receiver system.

The head unit may then process the data further (if necessary) and provide the data to a user, for example as audio in the case of program data and a visual representation of the data service data. FIG. 1 shows and example of a receiver and head unit for receiving multiplexed program and data service data.

FIG. 1 comprises an antenna 101 coupled to a receiver 102. The receiver 102 may further be coupled to a head unit 103. The receiver may provide front end processing and demultiplex the incoming data into packet streams or data channels to be sent to the head unit 103 for further processing and display to the user. The head unit 103 may further be coupled to other systems of a vehicle 104*a, b*, and *c*, for example the head unit may be configured to display vehicle to vehicle (V2V) information received from other vehicles or via a radar system and/or other safety information to a driver of the vehicle.

Figure 2:
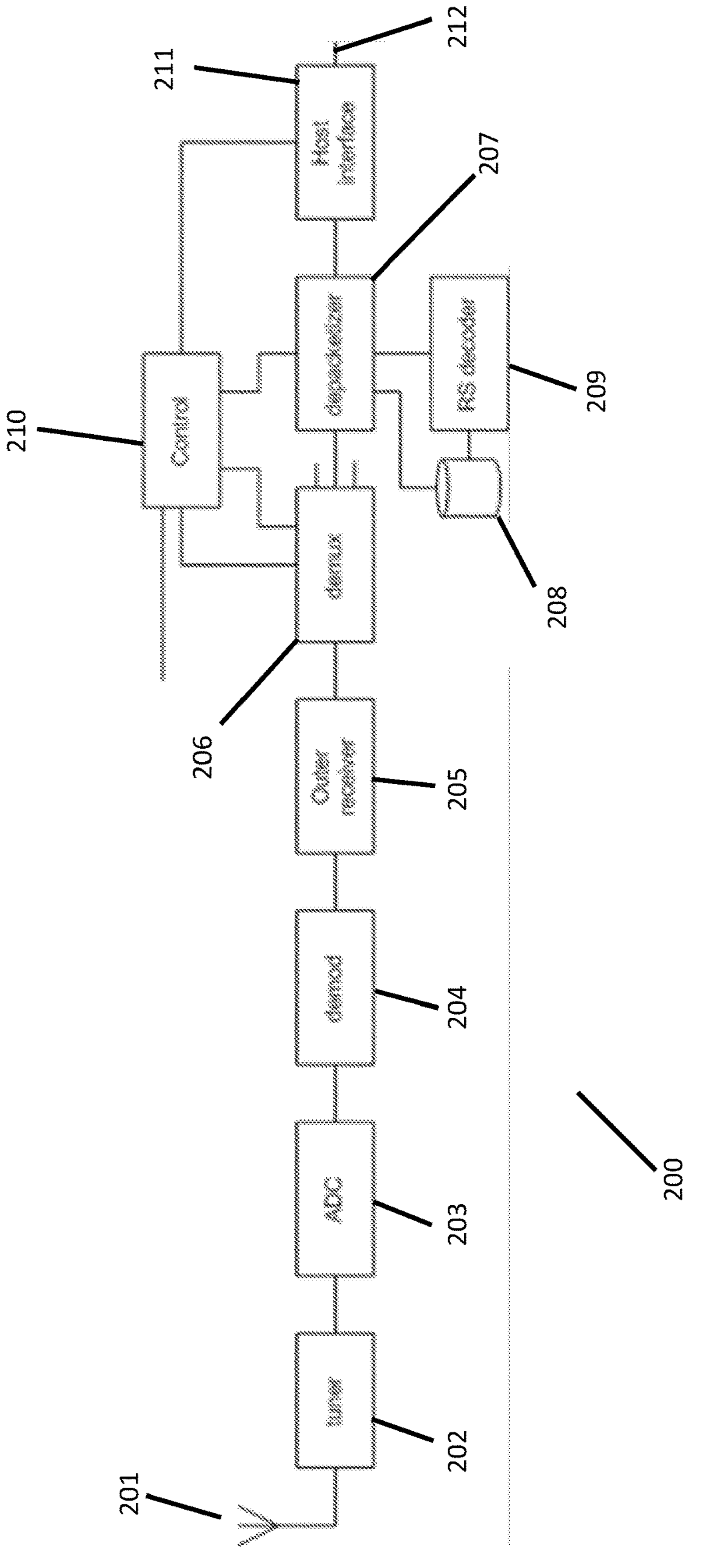
FIG. 2 is an example of a DAB broadcast receiver.

FIG. 2 shows a more detailed diagram of one example of a digital radio receiver.

The receiver 200 of FIG. 2 comprises an antenna 201 coupled to a tuner or mixer 202. The antenna 201 may receive a multiplexed digital broadcast signal and the tuner 201 may down-convert or filter the received signal to a lower bandwidth for processing by the receiver 200. The output of the tuner 202 is coupled to an analogue to digital converter 203 which may convert the down converted signal to digital samples, for example I and Q samples. The digital samples are provided to a demodulator 204. The demodulator 204 may attempt to synchronize to the DAB stream by performing a fast fourier transform (FFT) and de-mapping of the received OFDM signal. The demodulator 204 may produce soft bits which are sent to an outer receiver 205. The outer receiver may carry out functions such as time-deinterleaving, depuncturing, viterbi decoding and descrambling.

The outer receiver 205 may provide decoded so-called hard bits to a demultiplexor 206. The decoded hard bits may be provided in a specific format, for example a DAB format. The demultiplexor 206 may be coupled to receive control signals from a controller 210 and provide information to the controller 210. The controller 210 may be coupled to provide feedback commands to the tuner 202 and demodulator 204. The demultiplexor 206 may demultiplex the received multiplexed program and data service information. The output of the demultiplexor 206 is coupled to a depacketizer 207.

The depacketizer 207 is also coupled to receive control information from the controller 210. The depacketizer 207 is further coupled to a Reed-Solomon (RS) decoder 209 and erasure store 208 for assisting the depacketizer 207 in carrying out RS error correction. The depacketizer may create packet data to be sent to the head unit and carried out the RS error correction. The output of the depacketizer 207 is coupled to a host interface unit 211 which transmits requested data to a head unit or host processor via an output 212. The controller 210 may also be coupled to the host interface 211 to provide some control communication with the host processor or head unit.

The receiver 102 or 200 may provide the head unit 103 with service data which may be processed at the head unit. In some cases this data may pose a security risk to the vehicle as malicious data may be sent as data service information. In some cases, the data received data may have been modified such that it can be used to hack attack a vehicle via the car entertainment system. For example, the car infotainment system comprising the receiver and head unit may process digital broadcast data to display for example text and pictures on a vehicle dashboard screen. A malicious sender may send code under the guise of this data that would adversely affect one or more of the vehicle systems. In cases where the head unit or host processor is coupled to further systems, for example 104*a, b*, and *c*, there may be a risk that such malicious code may be able to access those systems through the head unit. For example control may be gained of more critical systems such as steering and braking.

The present application aims to address the risk of malicious data being received via a radio receiver of a vehicle. In specific examples the receiver is a DAB receiver however it will be appreciated that the receiver may operate in accordance with any digital broadcast technology. In examples, an antivirus algorithm may be deployed at the receiver after the data channel decoding of the data has taken place. This may equate to providing an anti-virus algorithm just prior to providing data to the host interface 211 for transmission to the head unit. In the example of FIG. 2, the antivirus algorithm may run on data at the output of the depacketizer 207. In other examples, the antivirus algorithm may be deployed at the receiver after the broadcast data has been received and before data decoding has taken place. For example, the antivirus algorithm may be deployed at the output of the tuner 202. In these examples, an antivirus algorithm may be carried out to check one or more of the data channels carried in the received broadcast data signal. It will be appreciated that while some examples are specific to a DAB receiver, embodiments may be implemented with other types of digital receivers.

Figure 3:
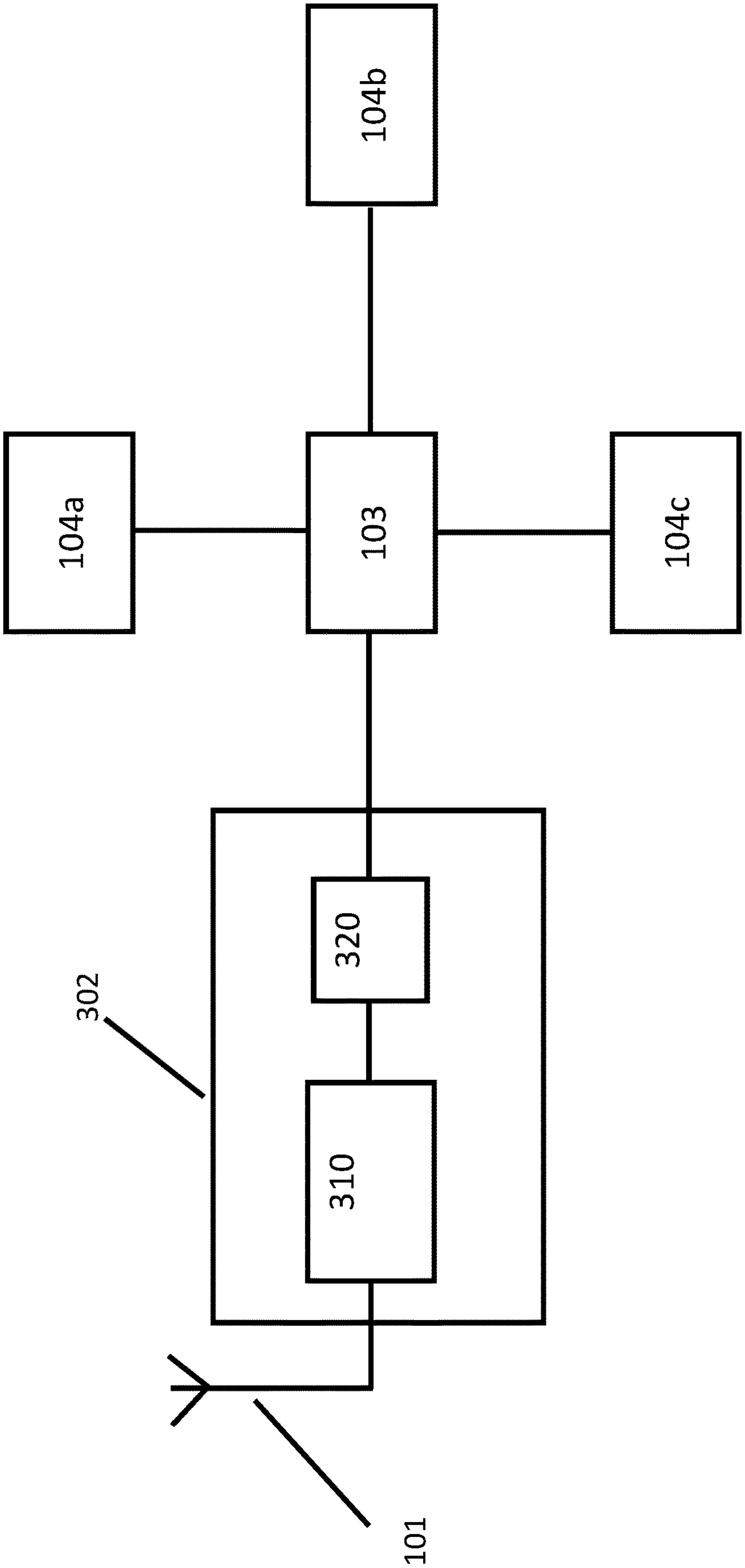
FIG. 3 is an example of a digital receiver system receiver according to an embodiment.

FIG. 3 shows an example of a digital receiver and head unit comprising an antivirus algorithm capability.

FIG. 3 comprises an antenna 101 coupled to a digital receiver 302. The digital receiver 302 may be coupled to a head unit or host processor 103. The host processor 103 may be configured to display and process program and data service data received from the receiver 302. The host processor 103 may be further coupled to receive and process data from one or more other systems 104*a, b*, and *c*, for example navigation, radar or other vehicle to vehicle or vehicle control systems.

The digital receiver 310 may comprise digital receiver circuitry 310 which may be configured to carry out the functions as described in relation to figured 2. The digital receiver 302 may further comprise an antivirus algorithm block configured to carry out antivirus detection on the received data. The antivirus algorithm block may comprise a processor and memory carrying instructions for carrying out an antivirus operation on the received data. In some examples, the processor may be a shared processor for carrying out other functionality.

In the example of FIG. 3, the anti-virus block is placed just after the digital receiver circuitry, however it will be appreciated that in other examples, the anti-virus block may be placed at the antenna side of the digital receiver circuitry or be placed in parallel to receive date from some point in the processing pipeline of the digital receiver circuitry.

The antivirus algorithm block may be configured to operate on data just prior to that data being provided to a host interface for transmission to the host processor or head unit 103. For example, the antivirus operation may operate received data that has been decoded by the digital receiver circuitry. In some example, the antivirus algorithm operates on decoded data that has been requested by the head unit 103 prior to that data being forwarded to the head unit from the digital receiver 302.

In examples, the antivirus algorithm may be any suitable algorithm. For example, the algorithm may be an algorithm that can handle JPEG data. In examples, the antivirus algorithm may be implemented in software and/or hardware and may, in some cases, be periodically updated. In other example, the algorithm may be a commercially available algorithm.

If the algorithm carried out by the antivirus block 320 detects malicious data, an indication of the detection may be sent to the head unit 103. The indication may or may not be accompanied by the malicious data itself. In some examples, the malicious data may be deleted at the digital receiver 302. In other cases, the malicious data may be sent to the host processor or head unit 103 for processing or reporting by the head unit 103.

Figure 4:
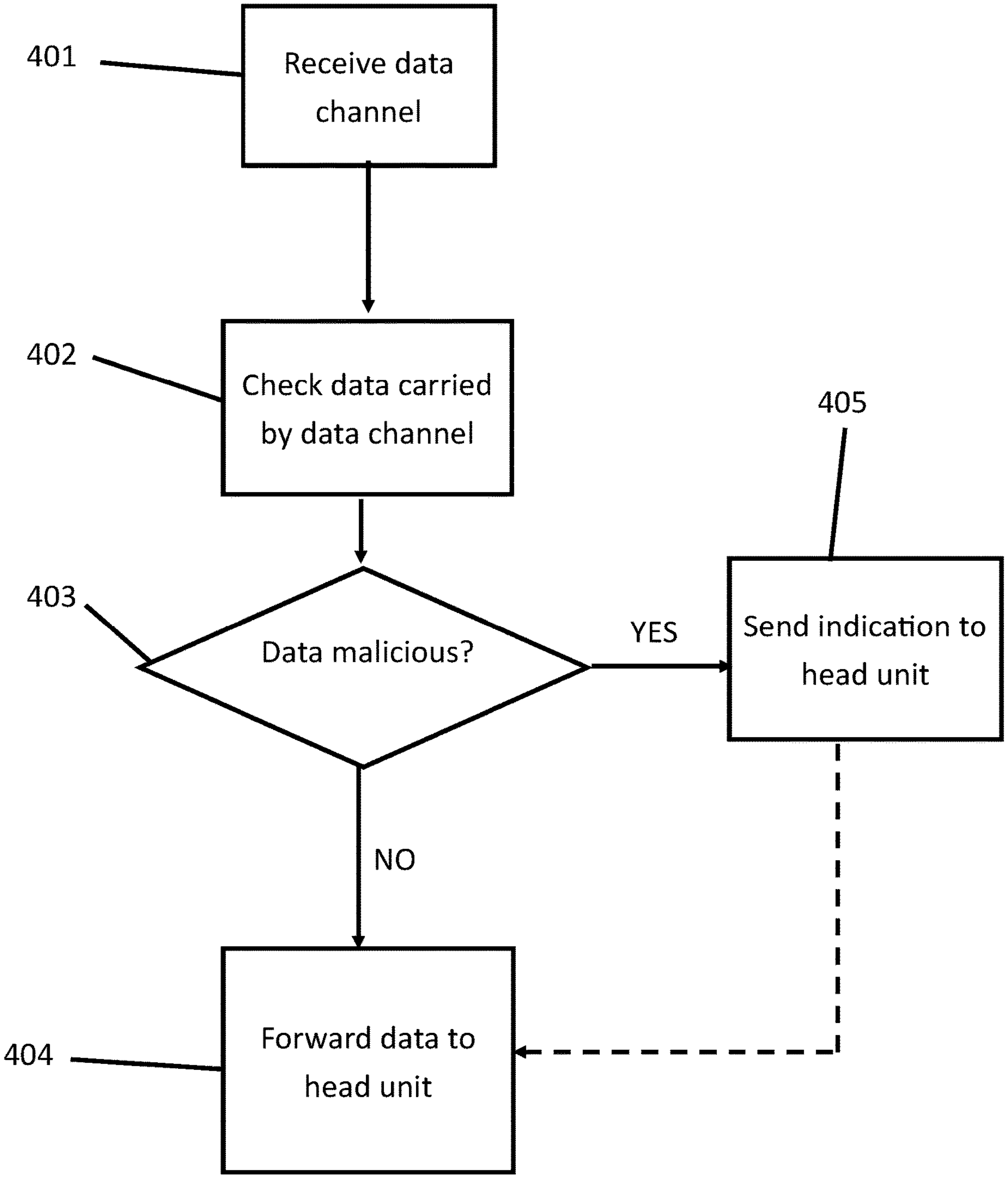
FIG. 4 is a flow diagram depicting the method steps carried out in accordance with an embodiment.

FIG. 4 is a flow diagram depicting method steps that may be carried out by the antivirus algorithm block.

At step 402, the antivirus algorithm block may receive a data channel that was received by the receiver as part of a digital signal. In some examples the data channel may be a decoded data channel. In other examples, the data channel may be received along with other data channels carried by the digital signal prior to decoding. The data channel may have been requested by the head unit 103, for example via a user selection. The antivirus algorithm may operate on the data carried by the one or more data channels and check whether the data is malicious at step 402. At step 403, if it is determined that the data is not malicious, the method proceeds to step 404 where the decoded data is forwarded to the head unit. At step 403, if it is determined that the data is malicious, the method proceeds to step 405 where an indication that malicious data has been detected is sent to the head unit. Optionally in some examples, the malicious data may be forwarded to the head unit along with the indication. In other examples, the malicious data may be deleted or quarantined at either the receiver or the head unit.

In the forgoing, the antivirus check is described as being carried out after a step of decoding a data channel of the received broadcast data signal. It will however be appreciated that in some embodiments, the antivirus check may be carried out prior to a data channel being decoded. The check may be carried out on all received encoded data channels. In another example, the check may only be carried out on a data channel selected to be output to a user.

In the foregoing, the antivirus algorithm is described as being run and located at the digital receiver 302. It will be appreciated that the digital receiver does not execute or use the data but processes it to be in a format to be forwarded to the head unit 103. It will also be appreciated that the algorithm may be periodically updated. For example the updates may be done via traditional Automobile manufacture approaches performed over cables. In other examples, the updates may be carried out with Over-The-Air Software updates. A protocol may be implemented that provides data integrity, data authentication, data confidentiality, and freshness. In some examples, methods such as Tesla may be used.

In the foregoing, it is described that data service data is checked to be malicious by anti-virus software. It will be appreciated that in other examples program data may also or alternatively be checked. In these examples program data may be audio data transmitted from a broadcast source.

In the foregoing the digital radio service has been described as being DAB. It will however be appreciated that embodiments may be applicable to other digital radio and/or broadcast service technology, For example, embodiments may be applicable to HD, DRM (digital radio monodial), DRM+, DAB+ and/or CDR

The invention claimed is:

1. A digital broadcast receiver comprising:

an antenna configured to receive a digital broadcast;

an anti-virus unit, located at an antenna side of the digital broadcast receiver, configured to carry out an anti-virus check and identify malicious data on at least one data channel received as part of the digital broadcast; and a host interface configured to provide the at least one decoded data channel including malicious data and an indication of a presence of malicious content in the malicious data to a host.

2. The digital broadcast receiver of claim 1, wherein the at least one data channel is an encoded data channel.

3. The digital broadcast receiver of claim 1, wherein the at least one data channel comprises all of the encoded data channels received as part of the digital broadcast.

4. The digital broadcast receiver of claim 1, further comprising a first processing path configured to decode a first data channel of the digital broadcast.

5. The digital broadcast receiver of claim 4, wherein the antivirus unit is configured to carry out the antivirus check on the decoded first data channel.

6. The digital broadcast receiver of claim 1, wherein the anti-virus unit is configured to carry out the anti-virus check on the at least one data channel when that data channel is requested by a host processor.

7. The digital broadcast receiver of claim 1, wherein when the malicious data is identified by the anti-virus check, the anti-virus unit is further configured to forward an indication of the malicious data to the host processor.

8. The digital broadcast receiver of claim 7, wherein when the malicious data is identified by the anti-virus check, the anti-virus unit is further configured to delete the malicious data.

9. The digital broadcast receiver of claim 7, wherein when the malicious data is identified by the anti-virus check, the anti-virus unit is further configured to forward the malicious data to the host processor along with the indication.

10. The digital broadcast receiver of claim 1, wherein when the malicious data is not identified by the anti-virus check, the anti-virus unit is further configured to forward the at least one decoded data stream to the host processor.

11. The digital broadcast receiver of claim 1, wherein the digital broadcast receiver is a digital audio broadcast DAB+ receiver.

12. A method comprising:

receiving, with an antenna, a digital broadcast comprising a plurality of data channels;

carrying out, at an antenna side of the digital broadcast receiver, an anti-virus check that identifies malicious data on at least one of the plurality of data channels; and providing the at least one decoded data channel including malicious data and an indication of a presence of malicious content in the malicious data to a host.

13. The method of claim 12, wherein the at least one data channel is an encoded data channel.

14. The method of claim 12, further comprising carrying out the antivirus check on the plurality of data channels prior to any one of the data channels being decoded.

15. The method of claim 12, further comprising decoding a first data channel of the digital broadcast.

16. The digital broadcast receiver of claim 1, wherein the antenna is coupled to a tuner.

17. The digital broadcast receiver of claim 16, wherein the anti-virus check is performed on data output by the tuner.

* * * * *